United States Patent
Honiden

[11] 3,882,828
[45] May 13, 1975

[54] FUEL INJECTION TYPE ROTARY PISTON ENGINE

[75] Inventor: Yoshinori Honiden, Hiroshima, Japan

[73] Assignee: Toyo Kogyo Co., Ltd., Hiroshima, Japan

[22] Filed: Sept. 27, 1973

[21] Appl. No.: 401,255

[30] Foreign Application Priority Data
Sept. 27, 1972 Japan............................ 47-112000

[52] U.S. Cl.............................. 123/8.09; 123/33 E
[51] Int. Cl........................................... F02b 53/10
[58] Field of Search........... 123/8.09, 8.13, 26, 33 E

[56] References Cited
UNITED STATES PATENTS

| | | | |
|---|---|---|---|
| 3,126,876 | 3/1964 | Kimberley | 123/8.13 |
| 3,384,054 | 5/1968 | Lamm | 123/8.45 |
| 3,650,261 | 3/1972 | Hutsell | 123/26 X |

Primary Examiner—William L. Freeh
Assistant Examiner—Michael Koczo, Jr.
Attorney, Agent, or Firm—Fleit & Jacobson

[57] ABSTRACT

A fuel injection type rotary piston engine has an intake port, a fuel injection nozzle and an auxiliary air port. The intake port is provided on at least one of side housings for introducing fresh air into the working chamber of the rotary engine. The fuel injection nozzle is provided on the rotor housing for injecting fuel into the working chamber. The air port is provided in the rotor housing for introducing auxiliary air into the working chamber in such a direction that the auxiliary air flow intersects the injected fuel stream.

10 Claims, 4 Drawing Figures

FUEL INJECTION TYPE ROTARY PISTON ENGINE

The present invention relates to a rotary piston type internal combustion engine and more particularly to a fuel injection type rotary piston engine.

In a fuel injection type internal combustion engine, it has always been experienced that output pressure of fuel injection pump is so decreased during low speed operation of the engine that the injected fuel cannot be sufficiently atomized. In a rotary piston type engine comprising a casing which is constituted by a rotor housing having a trochoidal inner peripheral wall surface and a pair of side housings airtightly secured to the opposite sides of said rotor housing, and a polygonal rotor having apices sealingly contacting the inner peripheral surface of said rotor housing, the area of air intake port means is so determined that sufficient amount of air can be introduced therethrough at the maximum engine speed. Therefore, under an idling or low engine speed, the intake air speed is remarkably reduced to such an extent that the injected fuel can no longer be atomized by the intake air flow even if they are introduced to intersect with each other. This often causes failure of ignition in the combustion chamber and results in rough engine operation.

The present invention has an object to eliminate the aforementioned disadvantages of known engines.

Another object of the present invention is to provide a rotary piston type internal combustion engine having means for facilitating atomization of fuel injected into working chamber of the engine during low speed operation.

A further object of the present invention is to provide a rotary piston type internal combustion engine which has means for introducing air flow in such a direction that it intersects flow of fuel injected into working chamber of the engine.

According to the present invention, the above objects can be achieved by a rotary piston type internal combustion engine comprising a casing which is constituted by a rotor housing having a trochoidal inner peripheral wall surface and a pair of side housings airtightly secured to the opposite sides of said rotor housing, a polygonal rotor having apices sealingly contacting with the inner peripheral surface of said rotor housing so as to provide working chambers between said rotor and said rotor housing, means for rotating said rotor and said rotor housing so as to effect volumetric changes of each working chamber through intake, compression, combustion and exhaust strokes, intake port means provided on at least one of said side housings for introducing fresh air into the working chamber which is in the intake stroke, fuel injection means provided on said rotor housing for injecting fuel into the working chamber which is in the intake stroke, and means provided in the rotor housing for introducing auxiliary air into said working chamber in such a direction that the auxiliary air flow intersects the injected fuel stream. The auxiliary air may be taken into the working chamber making use of the pressure difference between the air intake passage of the engine and means may be provided for opening the auxiliary air introducing means during low speed and light load operation of the engine.

The above and other objects and features of the present invention will become apparent from the following descriptions of preferred embodiments taking reference to the accompanying drawings, in which.

Figure 1:
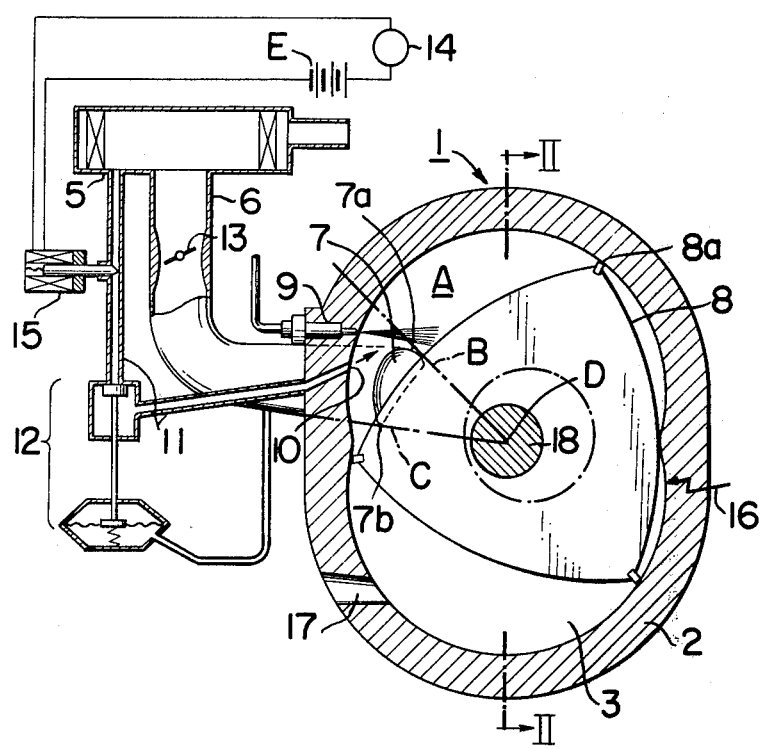
FIG. 1 is a diagrammatical sectional view of a rotary piston engine in accordance with one embodiment of the present invention.
Figure 2:
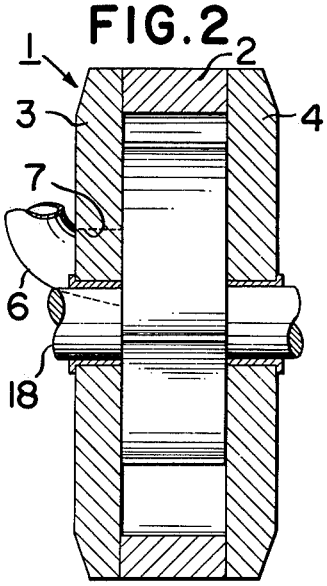
FIG. 2 is a sectional view taken substantially along the line II—II in FIG. 1.

Referring to the drawings, particularly to FIGS. 1 and 2, there is shown a rotary piston type internal combustion engine having a casing 1 which comprises a rotor housing 2 and a pair of side housings 3 and 4 secured to the opposite sides of the rotor housing 2. The rotor housing 2 has a trochoidal inner peripheral wall and a substantially triangular rotor 8 is disposed in the rotor housing 2 for rotation therein with the apices thereof in sliding contact with the inner wall surface of the rotor housing through apex seals 8a. Work chambers A of variable volume are thus defined between the rotor housing and the rotor.

The side housing 3 is provided at its inner surface with an intake port 7 for introducing air through an air filter 5 and an intake pipe 6 into the working chamber A which is in the intake stroke. A fuel injection nozzle 9 is provided on the rotor housing 2 adjacent to the intake port so that fuel is injected into the working chamber A through an area adjacent to the leading end 7a of the intake port 7.

The rotor housing 2 is further provided with an auxiliary air port 10 which is directed to introduce air in a direction intersecting the injected fuel stream. The port 10 is disposed in a sectional area defined by radial lines B and C passing through the center D of the housing and the leading and trailing ends 7a and 7b of the port 7. For the purpose of explanation, the auxiliary air port may be about 1/20 in effected area of the main intake port 7. The port 10 is connected with an air filter 5 through an auxiliary intake conduit 11 which includes a solenoid valve 15 and a diaphragm valve 12. The diaphragm valve 12 is actuated in accordance with the air pressure in the intake pipe 6 on the downstream side of the throttle valve 13 so that it is opened when the air pressure is reduced below a predetermined value. The solenoid valve 15 is connected with a battery E through a switch 14 which is closed in accordance with the engine speed, the vehicle speed or the position of the throttle valve 13. Thus, the auxiliary intake conduit 11 is opened during light load low speed operation or idling operation of the engine, so that auxiliary air is introduced from the air filter 5 through the conduit 11 and the port 10 into the working chamber A which is in the intake stroke. In the drawing, the reference numeral 16 designates a ignition spark plug, 17 an exhaust port and 18 an output shaft, which may be of conventional construction.

In operation, fresh air is introduced through the intake pipe 6 and the intake port 7 into the working chamber A during the intake stroke and at the same time fuel is injected into the same working chamber A through the nozzle 9. Under a normal engine speed, the injected fuel is sufficiently atomized by the turbulent air flow from the intake port 7 but, under a low speed light load operation or idling operation of the engine, for example below 2000 rpm, the output pressure of the fuel injection pump and the intake air flow are so decreased that sufficient atomization of fuel does not take place. According to the present invention, however, when the opening of the throttle valve 13 and the air pressure in the intake pipe downstream side of the throttle valve are decreased below predetermined values, the solenoid valve 15 and the diaphragm valve 12 are opened so as to allow air flow from the air filter through the conduit 11 and the port 10 into the working chamber A. The auxiliary air injected through the port 10 intersects the fuel stream injected from the nozzle 9 so that the fuel is sufficiently atomized.

Figure 3:
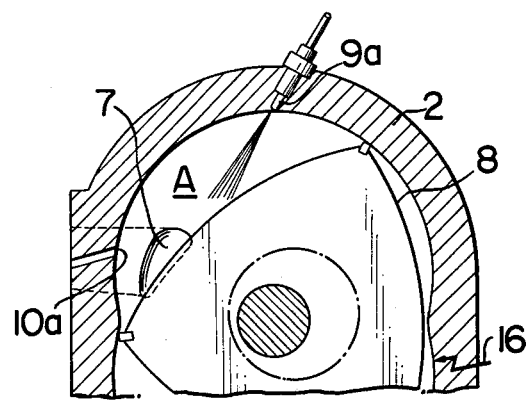
FIG. 3 is a fragmentary sectional view of a rotary piston engine in accordance with another embodiment of the present invention.
Figure 4:
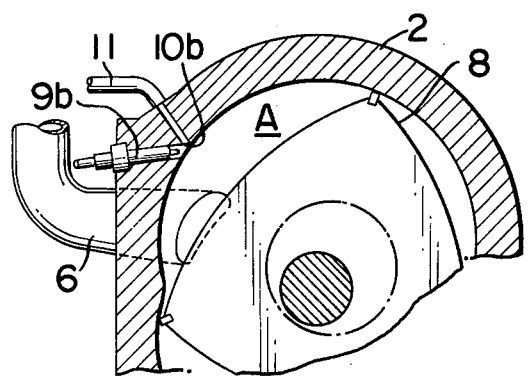
FIG. 4 is a sectional view showing a further embodiment of the present invention.

In the embodiment shown in FIG. 3, the basic construction of engine is the same as in the previous embodiment and like parts are designated by the same reference numerals as in the previous embodiment. In this embodiment, the fuel injection nozzle 9a is disposed apart from the auxiliary air port 10a but it is so directed that the injected fuel intersects the auxiliary air flow from the port 10a. In the embodiment shown in FIG. 4, the fuel injection nozzle 9b is disposed close to the auxiliary air port 10b so that they almost cross with each other at their discharge ends.

The present invention has thus been shown and described with reference to specific embodiments, however, it should be noted that the invention is in no way limited to the details of the illustrated structures but changes and modifications may be made without departing from the scope of the appended claims.

I claim:

1. A rotary piston type internal combustion engine comprising a casing including a rotor housing having a trochoidal inner peripheral wall surface and a pair of side housings airtightly secured to the opposite sides of said rotor housing, a polygonal rotor having apices sealingly contacting the inner peripheral surface of said rotor housing so as to provide working chambers between said rotor and said rotor housing, means for rotating said rotor so as to effect volumetric changes of each working chamber through intake, compression, combustion and exhaust strokes, intake port means provided in at least one of said side housings for introducing fresh air into the working chamber which is in the intake stroke, fuel injection means provided in said rotor housing for injecting fuel into the working chamber which is in the intake stroke, and means provided in the rotor housing for introducing auxiliary air into said working chamber, said means for introducing auxiliary air being spaced apart from said fuel injection means on said rotor housing and being positioned so that the auxiliary air flow intersects the injected fuel stream within said working chamber.

2. A rotary piston type internal combustion engine in accordance with claim 1 in which said auxiliary air introducing means comprises an air conduit opening into the working chamber which is in the intake stroke so that the auxiliary air is taken into the working chamber due to the pressure difference between the atmospheric pressure and the pressure in the working chamber.

3. A rotary piston type internal combustion engine in accordance with claim 2 in which said air conduit is provided with valve means which is controlled as a function of an engine operating condition.

4. A rotary piston type internal combustion engine in accordance with claim 3 in which said valve means is controlled so as to open during light load operation of the engine.

5. A rotary piston type internal combustion engine in accordance with claim 3 in which said valve means is controlled so as to open during low speed operation of the engine.

6. A rotary piston type internal combustion engine in accordance with claim 5 in which said valve means includes a solenoid valve which is opened when the engine throttle valve is closed.

7. A rotary piston type internal combustion engine in accordance with claim 5 in which said valve means includes a pressure responsive valve which is opened when the pressure in the intake port means is reduced below a predetermined value.

8. A rotary piston type internal combustion engine in accordance with claim 1 in which said auxiliary air introducing means opens into the working chamber within a sectorial area defined by center of the housings and both side extremities of the intake port means.

9. A rotary piston type internal combustion engine in accordance with claim 8 in which said fuel injection means is also disposed in said sectorial area.

10. A rotary piston type internal combustion engine in accordance with claim 8 in which said fuel injection means is disposed out of said sectorial area.

* * * * *